United States Patent
Doi et al.

(10) Patent No.: US 6,441,941 B2
(45) Date of Patent: Aug. 27, 2002

(54) LIGHT SHUTTER DEVICE

(75) Inventors: Isao Doi, Toyonaka; Itaru Saito, Nishinomiya; Tomohiko Masuda, Otsu; Tsukasa Yagi, Kobe; Ken Matsubara, Takatsuki; Yuji Kamoda, Ibaraki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/730,197

(22) Filed: Dec. 5, 2000

(30) Foreign Application Priority Data

Dec. 8, 1999 (JP) ............................. 11-348489
Jun. 13, 2000 (JP) ........................... 2000-176673

(51) Int. Cl.⁷ ................................................ G02F 1/03
(52) U.S. Cl. ..................... 359/245; 359/254; 359/271; 359/322; 396/457
(58) Field of Search .................. 359/245, 254, 359/251, 255, 256, 258, 315, 319, 320, 322, 323, 27.1, 237; 396/457, 506, 452, 249, 262; 349/56, 27.1, 322, 237

(56) References Cited

U.S. PATENT DOCUMENTS 4,854,678 A * 8/1989 Kitano et al. .............. 359/254
5,011,271 A * 4/1991 Saito et al. ................ 359/259

FOREIGN PATENT DOCUMENTS

| JP | 58-95320 A | 6/1983 |
| JP | 58-130321 A | 8/1983 |
| JP | 60-159722 A | 8/1985 |
| JP | 6-011674 A | 1/1994 |

* cited by examiner

Primary Examiner—Hung Xuan Dang
Assistant Examiner—Tuyen Tra
(74) Attorney, Agent, or Firm—Sidley Austin Brown & Wood LLP

(57) ABSTRACT

A light shutter device which has a plurality of light transmitting portions (light shutter elements) on a planar PLZT substrate. By applying voltages between a common electrode and individual electrodes to apply electric fields to the light shutter elements, the light shutter elements transmit and shut light individually. Suppose each of the individual electrodes faces the common electrode at a distance L and has a dimension W in a direction perpendicular to the direction of electric field, W/L>2. Suppose each of the individual electrodes has a dimension D in the direction of electric field, preferably D/L>0.5. Further, the individual electrodes are so placed that the distance between a side of one light shutter element which extends in a direction perpendicular to the direction of electric field and each of the individual electrodes which drive the other light shutter elements is not less than 5L.

19 Claims, 14 Drawing Sheets

(ALL LIGHTING)
L=20 μm
M=70 μm
Vd=100V (SINGLE LIGHTING)
L=20 μm
M=70 μm
Vd=130V

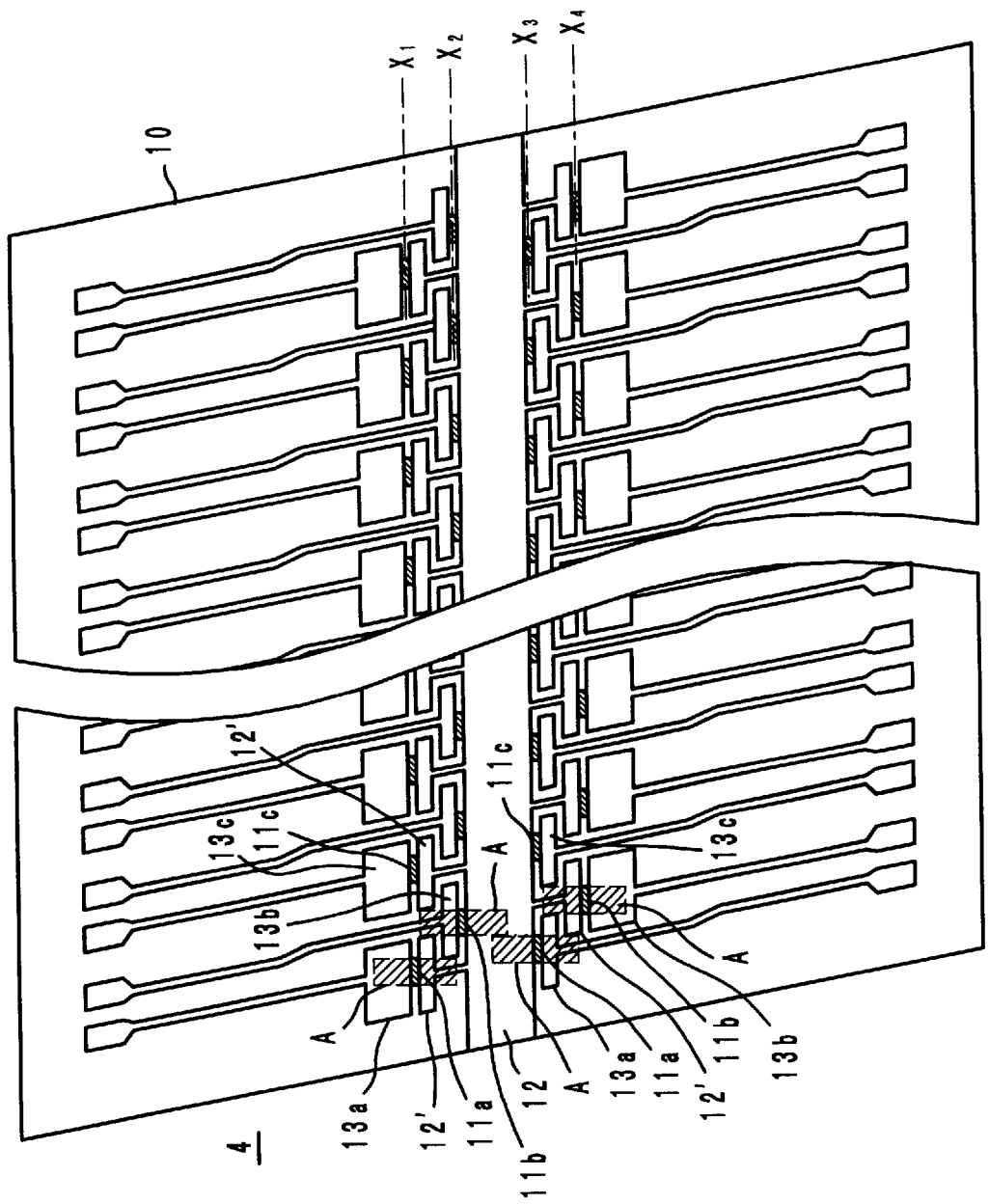

LIGHT SHUTTER DEVICE

This application is based on application Nos. 11-348489 and 2000-176673 filed in Japan, the contents of which are hereby incorporated by reference.

BACKGROUND OF THE INVENTION

1. Field of the Invention

The present invention relates to a light shutter device, and more particularly to a light shutter device which has a plurality of light shutter elements on a substrate with an electro-optical effect and which turns on and off the light by applying a voltage to the light shutter elements.

2. Description of Related Art

Conventionally, various kinds of light shutter devices have been developed to be used to form an image on silver salt photographic paper or film, or an electrophotographic photosensitive member. Such a light shutter device has light shutter chips made of PLZT, which is a material with an electro-optical effect, arranged in an array and controls turning on/off of the light pixel by pixel.

More specifically, as FIG. 17 shows, when a voltage is applied between a pair of electrodes 32 and 33 provided on a light shutter chip 30, the PLZT of the chip 30 causes birefringence. In this state, light which is incident to a light transmitting portion (light shutter element) 31 via a polarizer 35 which is arranged before the light shutter chip 30, is polarized by 90 degrees, and light is emergent from the light transmitting portion 31 and passes through an analyzer 36. Thus, light is turned on.

When the light transmitting portion polarizes the incident light at 90 degrees, the portion can transmit the light at the maximum, and the voltage applied between the electrodes to achieve the maximum quantity of transmitted light is referred to as a half-wave voltage. Therefore, light shutter elements of this kind are driven with the half-wave voltage applied; however, because of crosstalk between adjacent light shutter elements, the quantity of transmitted light fluctuates.

As far as one light shutter element is concerned, when all the light shutter elements of the device including the element concerned are turned on (all lighting), the light shutter element has a light transmitting characteristic shown by the curve A in FIG. 4a. On the other hand, when only the light shutter element concerned is turned on (single lighting), the light shutter element has a light transmitting characteristic shown by the curve B in FIG. 4a. In the case of FIG. 4a, when the half-wave voltage at the time of entire lighting is applied to the light shutter element for single lighting, the quantity of transmitted light is reduced approximately 12%, compared with the quantity of transmitted light when the same voltage is applied for all lighting. There is an approximately 25V shift in half-wave voltage between the time of all lighting and the time of single lighting.

In order to solve the problem, Japanese Patent Laid Open Publication No. 60-159722 suggested that shield electrodes are provided to extend from a common electrode to among light shutter elements. Also, Japanese Patent Laid Open Publication Nos. 58-95320 and 58-130321 suggested that grooves are provided among individual electrodes to prevent crosstalk.

However, the former measure has the following demerits: this is not suited to produce high-definition devices because the shield electrodes and the individual electrodes are too close to one another; and stray capacity occurring among the individual electrodes and the shield electrodes are large, which results in an increase in power consumption. Also, the latter measure has a demerit that this is not suited to produce high-definition devices because forming grooves among the individual electrodes complicates the manufacturing process.

SUMMARY OF THE INVENTION

An object of the present invention is to provide a light shutter device in which crosstalk between adjacent light shutter elements can be suppressed and which is easy to be produced and easy to be made into a high-definition device.

Another object of the present invention is to provide a light shutter device which has a low half-wave voltage.

In order to attain the objects, a first light shutter device according to the present invention comprises: a planar substrate with an electro-optical effect; and a plurality of pairs of electrodes provided on the substrate, portions of the substrate between the respective pairs of electrodes functioning as light shutter elements when electric fields act between the respective pairs of electrodes; wherein, suppose the electrodes in each pair are at a distance L from each other and a side which extends in a direction perpendicular to the direction of electric field of one of the electrodes in each pair has a dimension W, $W/L > 2$.

The present inventors gave an attention to the relationship between the distance L between the electrodes in each pair and the dimension W of one of the electrodes in each pair. In conventional devices, W/L is around 1. As a result of experiments, however, when $W/L > 2$, crosstalk between adjacent light shutter elements could be suppressed, and there was substantially no difference in quantity of transmitted light between a time of all lighting and a time of single lighting. This first light shutter device according to the present invention requires neither shield electrodes nor grooves among the light shutter elements, and accordingly, this device can be fabricated easily and can be made into a high-definition device easily. Moreover, this invention is not accompanied with an increase in power consumption, while providing shield electrodes results in an increase in power consumption.

In the first light shutter device, further, suppose one of the electrodes in each pair has a dimension D in the direction of electric field, preferably $D/L > 0.5$. On this condition, the half-wave voltage is lower.

A second light shutter device according to the present invention comprises: a planar substrate with an electro-optical effect; a common electrode which extends in a specified direction on the substrate; and a plurality of individual electrodes which are arranged along the common electrode so that each of the individual electrodes faces the common electrode, portions of the substrate between the common electrode and the respective individual electrodes functioning as light shutter elements when electric fields act between the common electrode and the respective individual electrodes; wherein suppose each of the individual electrodes faces the common electrode at a distance L, each of the light shutter elements is at a distance not less than 5L from each of the individual electrodes which drive the other light shutter elements.

The present inventors gave an attention to the positional relationship between each of the light shutter elements and the individual electrodes which drive the other light shutter elements and conducted various experiments about the relationship between the distance L between each of the individual electrodes and the common electrode, which means the dimension of each light shutter element in the direction of electric field, and the distance between the light shutter element and each of the individual electrodes which drive the other light shutter elements. As a result, when a light shutter element was located at not less than 5L from each of the individual electrodes which drive the other light shutter elements, crosstalk between the light shutter element and the adjacent elements could be suppressed, and the shift in half-wave voltage and the reduction in quantity of transmitted light at the time of single lighting were in an extent to cause substantially no problem.

A third light shutter device according to the present invention comprises: a planar substrate with an electro-optical effect; a common electrode which extends in a specified direction on the substrate; and a plurality of individual electrodes which are arranged along both sides of the common electrode so that each of the individual electrodes faces the common electrode, portions of the substrate between the common electrode and the respective individual electrodes functioning as light shutter elements when electric fields act between the common electrode and the respective individual electrodes; wherein the common electrode is separated by a groove which extends in the specified direction.

Since the common electrode is separated by a groove, crosstalk between the light shutter elements which are located on both sides of the common electrode can be suppressed, and the quantity of transmitted light at a time of single lighting is almost equal to that at a time of all lighting. Forming one groove is enough, and this does not complicate the manufacturing process of this light shutter device.

Further, in the third light shutter device, suppose each of the individual electrodes faces the common electrode at a distance L, each of the light shutter elements is preferably at a distance not less than 5L from each of the individual electrodes which drive the other light shutter elements. With this arrangement, crosstalk between adjacent light shutter elements can be suppressed more.

BRIEF DESCRIPTION OF THE DRAWINGS

These and other objects and features of the present invention will be apparent from the following description with reference to the accompanying drawings, in which:

FIG. 13 is a plan view of a principal part of a light shutter device which is a fifth embodiment of the present invention;

DETAILED DESCRIPTION OF THE PREFERRED EMBODIMENTS

Figure 17:
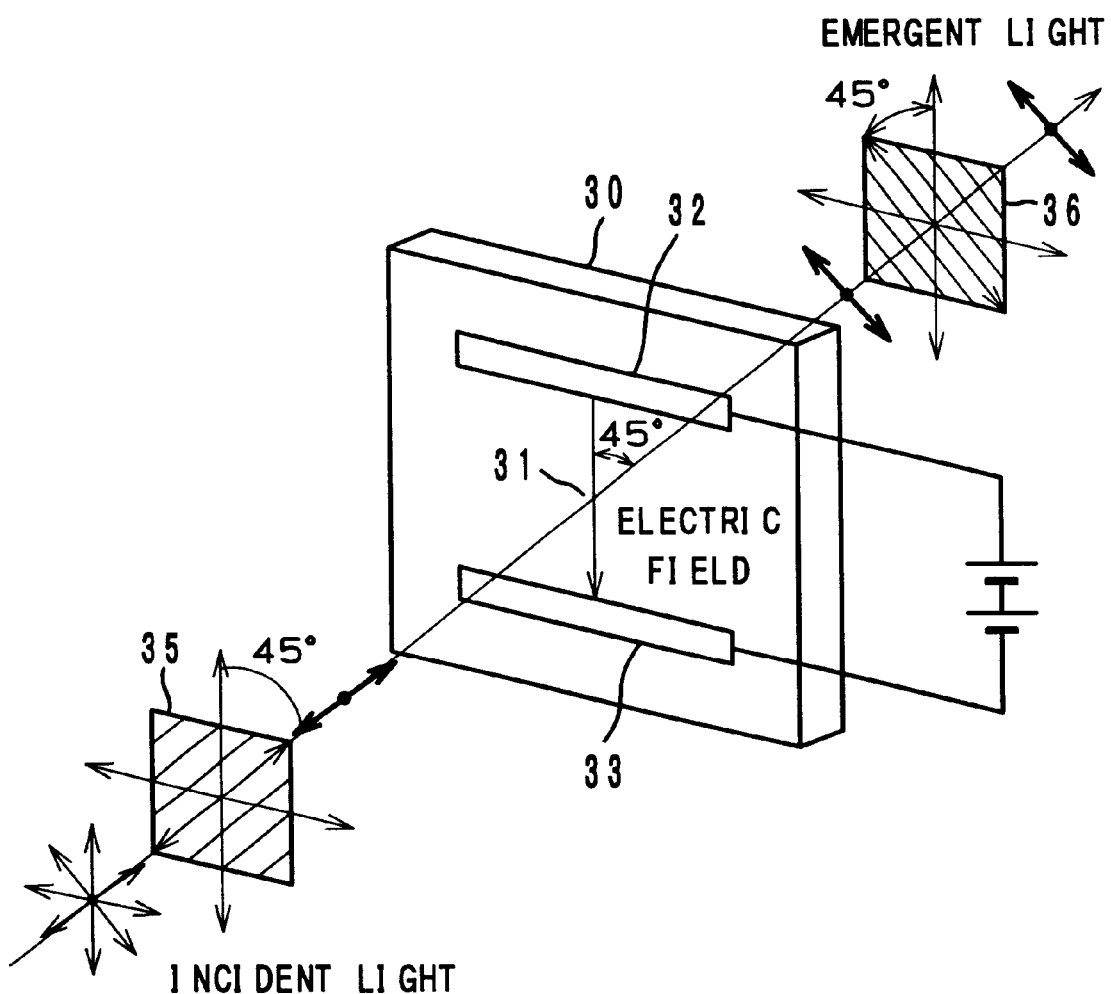
FIG. 17 is a perspective view which shows the operation principle of a light shutter device.

Embodiments of a light shutter device according to the present invention are described with reference to the accompanying drawings. The embodiments below are light shutter devices which operate (turn on and turn off the light) based on the well-known principle illustrated in FIG. 17, and repetitious descriptions are avoided.

First Embodiment; See FIG. 1

Figure 1:
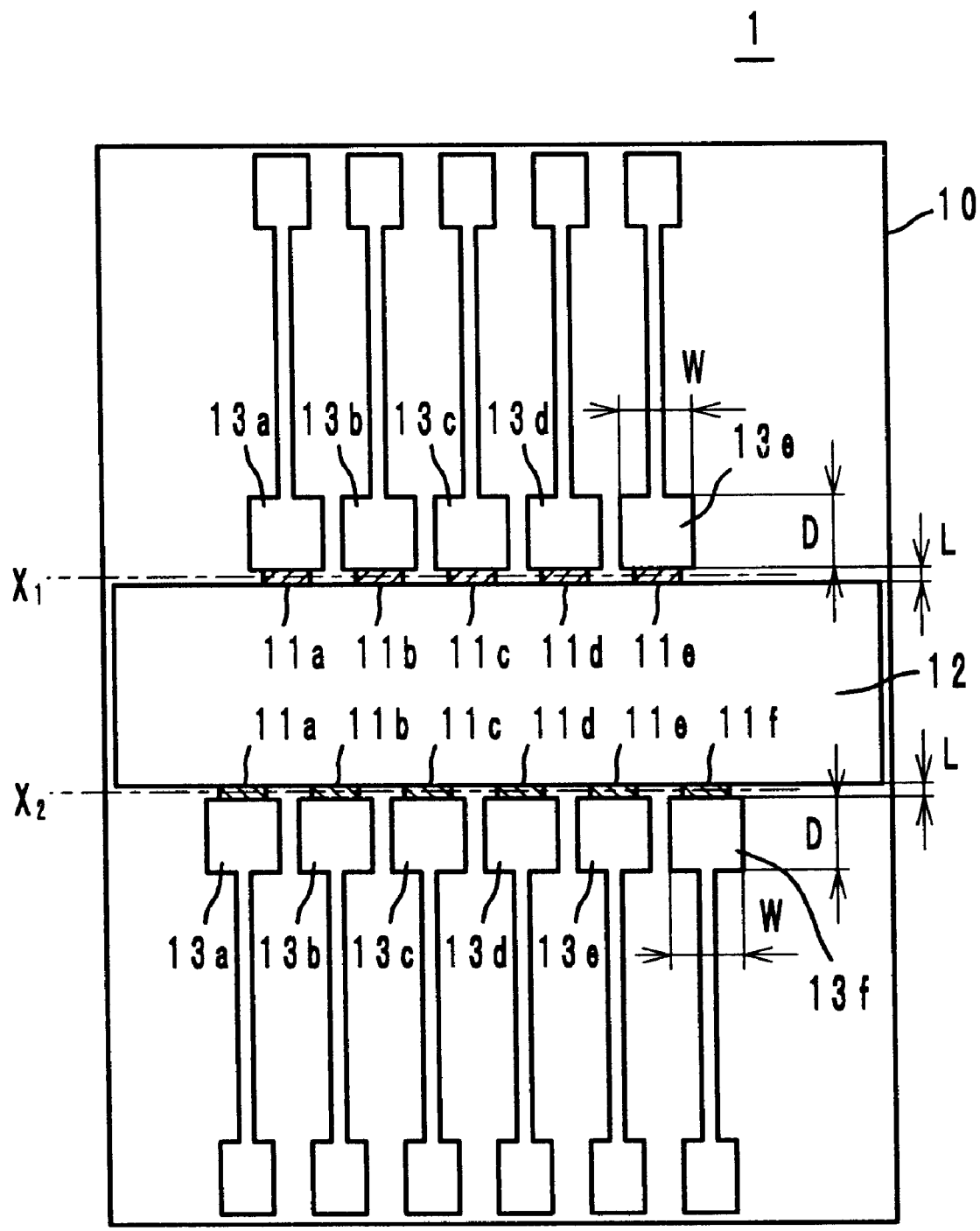
FIG. 1 is a plan view of a principal part of a light shutter device which is a first embodiment of the present invention.

FIG. 1 shows a principal part of a light shutter device 1 which is a first embodiment of the present invention. This light shutter device 1 has a plurality of light transmitting portions (light shutter elements) 11a, 11b, . . . , which are shadowed in FIG. 1, on a planar PLZT chip 10. The light shutter elements 11a, 11b, . . . are arranged in two lines $X_1$ and $X_2$ alternately, in other words, light shutter elements to form adjacent pixels in one line of an image are arranged in mutually different lines. The light shutter elements 11a, 11b, . . . in the two lines are driven to be turned on and off in synchronization with motion of a light receiving surface in a sub scanning direction so as to form one line on the light receiving surface.

In order to drive the light shutter elements 11a, 11b, . . . , a common electrode 12 is provided in the center of the chip 10, and individual electrodes 13a, 13b, . . . are provided at both sides of the common electrode 12 with the light shutter elements 11a, 11b, . . . in-between.

The gap between the common electrode 12 and each of the individual electrodes 13a, 13b, . . . is supposed to be L, and the dimension of the individual electrodes 13a, 13b, . . . in the direction perpendicular to the direction of electric field is supposed to be W. According to an experiment conducted by the inventors, when L and W were so designed that W/L would be over 2, the mutual influences of the electric fields which occur on the respective light shutter elements 11a, 11b, . . . could be inhibited, and crosstalk could be suppressed.

Figure 4A:
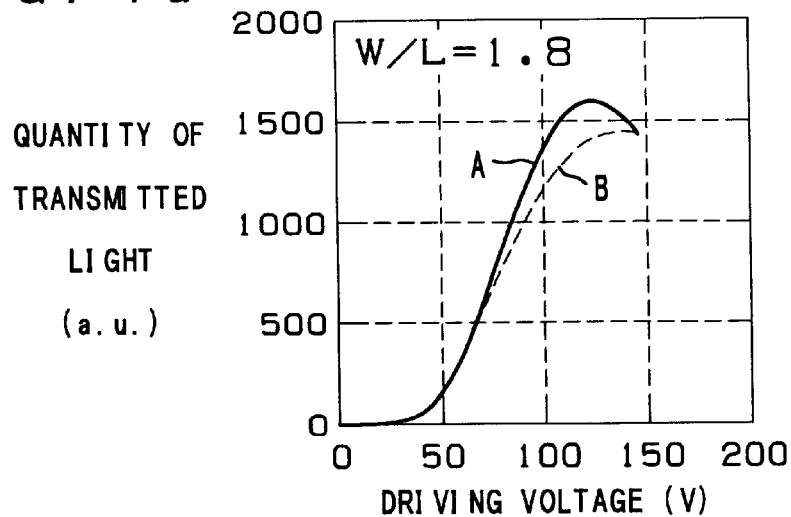
FIGS. 4a, 4b and 4c are graphs which show the relationship between driving voltage and quantity of transmitted light in the first and second embodiments.
Figure 4B:
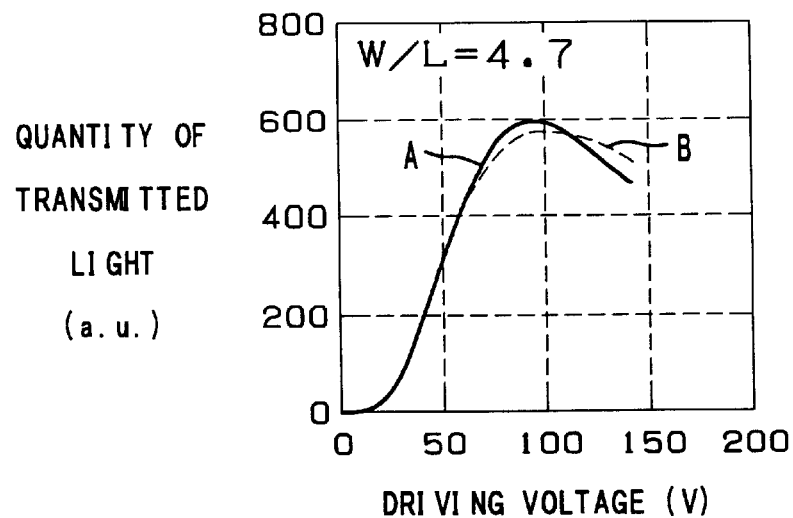

In the first embodiment shown by FIG. 1, W/L is 4.7. The relationship between driving voltage and quantity of transmitted light in this embodiment is shown by FIG. 4b. In FIG.

4b, the curve A shows a light transmitting characteristic of one of the light shutter elements when all the light shutter elements are turned on, and the curve B shows a light transmitting characteristic of the light shutter element when only the light shutter element is turned on. Compared with the case of FIG. 4a, in the first embodiment in which W/L is 4.7, although there is a slight difference between the characteristic curves A and B in shape, there are almost no differences between the curves A and B in half-wave voltage and maximum quantity of light.

Second Embodiment; See FIG. 3

Figure 3:
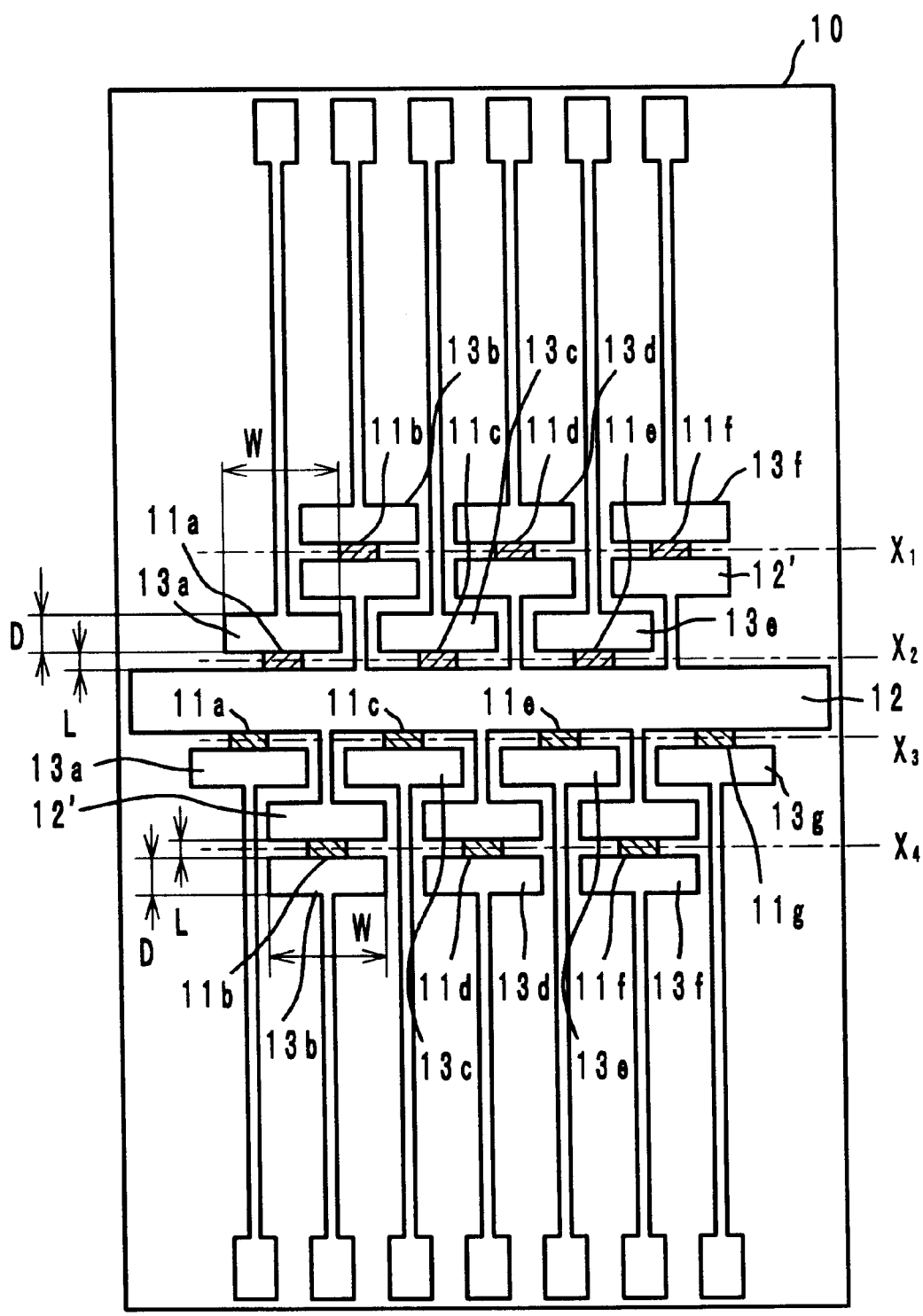
FIG. 3 is a plan view of a principal part of a light shutter device which is a second embodiment of the present invention.

FIG. 3 shows a principal part of a light shutter device 2 which is a second embodiment of the present invention. This light shutter device 2 has a plurality of light transmitting portions (light shutter elements) 11a, 11b, . . . , which are shadowed in FIG. 3, on a planar PLZT chip 10. The light shutter elements 11a, 11b, . . . are arranged in four lines $X_1$, $X_2$, $X_3$ and $X_4$ in such a way that light shutter elements to form adjacent pixels in one line of an image are arranged in mutually different lines. The light shutter elements 11a, 11b, . . . in the four lines are driven to be turned on and off in synchronization with motion of a light receiving surface in a sub scanning direction so as to form one line on the light receiving surface.

In the second embodiment, the common electrode 12 has extensions 12' which are drawn from both sides of the central portion of the common electrode 12. The individual electrodes 13a, 13b, . . . face the central portion or the extensions 12' of the common electrode 12. According to an experiment using the second embodiment, by setting W/L over 2, the mutual influences of the electric fields which occur on the respective light shutter elements 11a, 11b, . . . could be inhibited, and crosstalk could be suppressed.

Figure 4C:
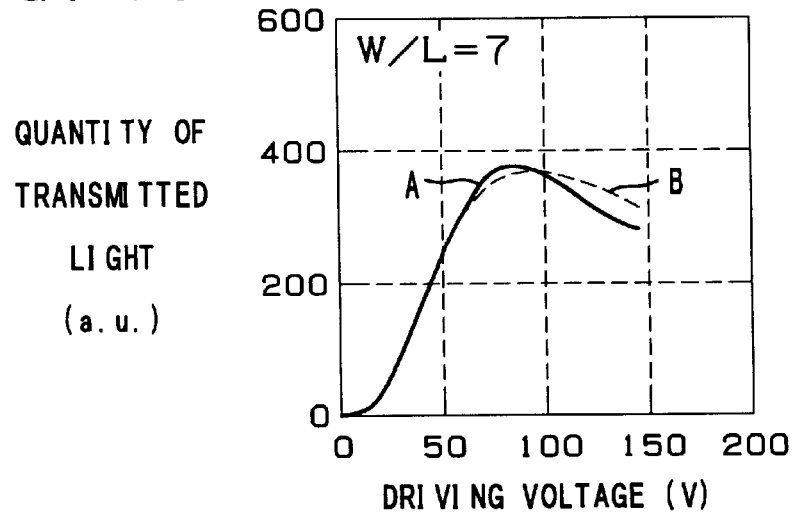

In the second embodiment shown by FIG. 3, W/L is 7. The relationship between driving voltage and quantity of transmitted light in this embodiment is shown by FIG. 4c. The curve A in FIG. 4c shows a characteristic of one of the light shutter elements 11a, 11b, . . . when all the light shutter elements 11a, 11b, . . . are turned on, and the curve B shows a characteristic of the light shutter element when only the light shutter element is turned on. Compared with the case of FIG. 4a, in the second embodiment in which W/L is 7, although there is a slight difference between the characteristic curves A and B in shape, there are almost no differences between the curves A and B in half-wave voltage and maximum quantity of light.

Shield Mask; See FIG. 2

Figure 2:
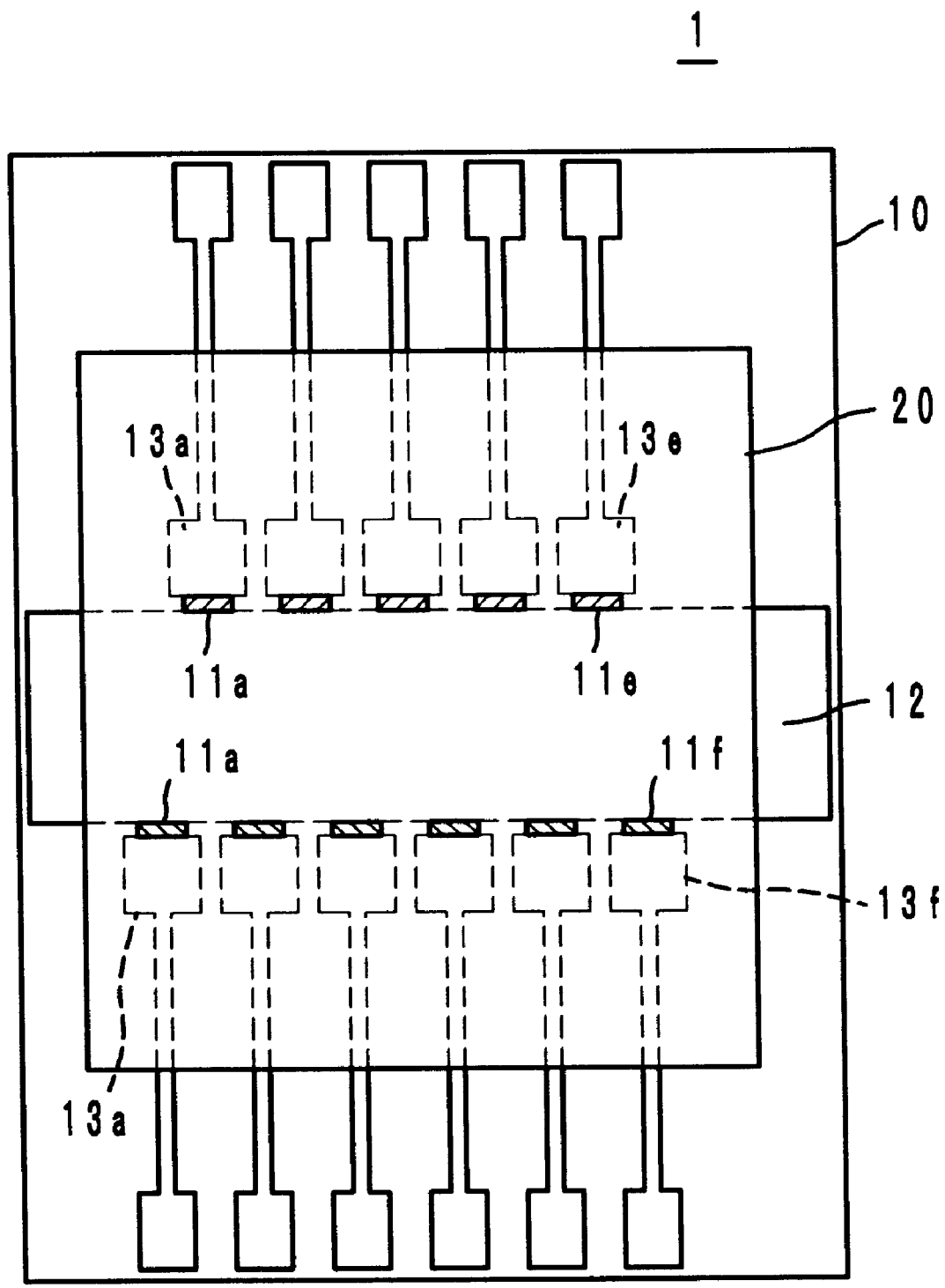
FIG. 2 is a plan view of the light shutter device which is covered with a shield mask.

When the light shutter devices 1 and 2 are installed in printers, as FIG. 2 shows (FIG. 2 shows the first embodiment), shield masks 20 which cover the respective light shutter devices other than the light shutter elements 11a, 11b, . . . are provided.

The shield mask 20 can be formed by forming a film on the chip 10 and by making holes in the film on the light shutter elements 11a, 11b, . . . by photolithography. An insulating and light shielding material shall be selected for the film. For example, resin on which a black pigment is dispersed is usable. Also, a mask plate on which a shield film is patterned may be placed on the chip 10 as the shield mask 20, and other various shielding ways can be adopted.

Width and Placement of Light Shutter Elements

The width of the light shutter elements 11a, 11b, . . . , that is, the dimension of the light shutter elements in the main scanning direction is determined depending on the image resolution. For example, if the image resolution is 400 dpi, the width is 63.5 µm, and if the image resolution is 600 dpi, the width is 42 µm. Each of the light shutter elements is preferably positioned in the center of the dimension W of the corresponding individual electrode. In the above-described first embodiment and the second embodiment, the image resolution is 400 dpi.

Dependency of Crosstalk on W/L

Figure 5:
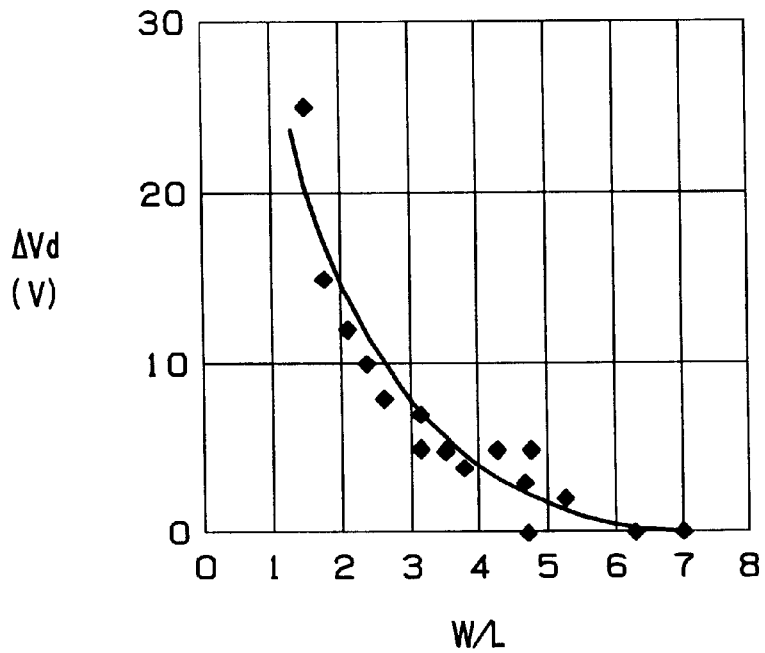
FIG. 5 is a graph which shows the relationship between W/L and shift in half-wave voltage in the first and second embodiments.
Figure 6:
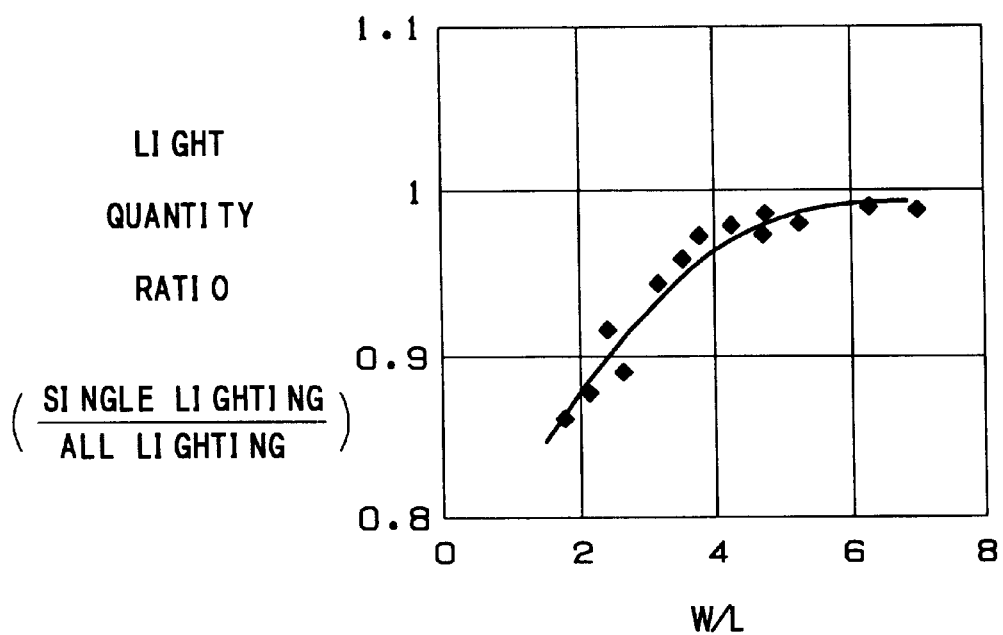
FIG. 6 is a graph which shows the relationship between W/L and light quantity ratio in the first and second embodiments.

FIGS. 5 and 6 show the results of experiments. FIG. 5 shows the relationship between W/L and half-wave voltage shift ΔVd between the time of all lighting and the time of single lighting. FIG. 6 shows the relationship between W/L and the rate of the quantity of transmitted light at the time of single lighting to that at the time of all lighting.

As is apparent from FIGS. 5 and 6, the larger W/L is, the smaller crosstalk is. There are no practical problems when W/L>2.

The value W/L can be set larger by setting the value L smaller. That L is small means that the area if the portion functioning as a light shutter element is small, and if L is too small, the illumination system will have too much burden to achieve a sufficient quantity of transmitted light. Practically, L is preferably not less than 5 µm and shall be determined in consideration for other factors of the print system and the desired performance as a light shutter.

Dependency of Half-wave Voltage on D/L

Figure 7:
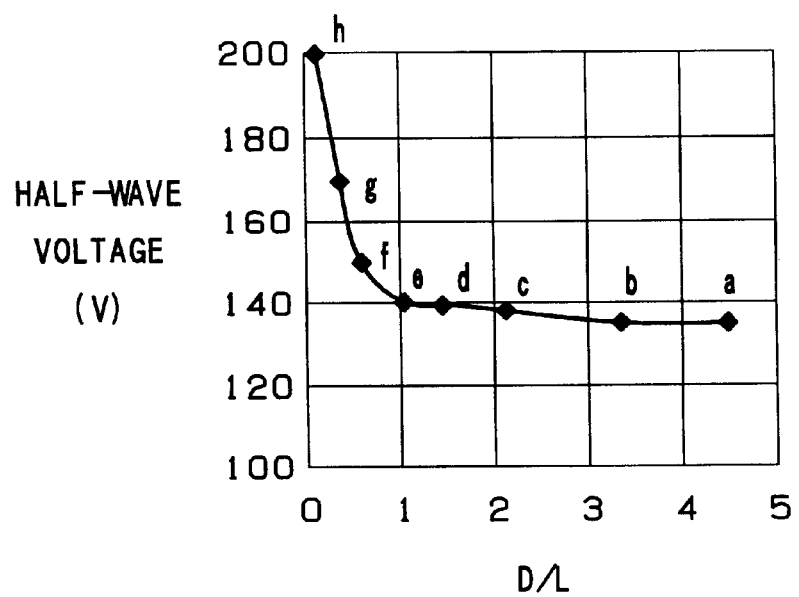
FIG. 7 is a graph which shows the relationship between D/L and half-wave voltage in the first and second embodiments.

If the individual electrodes 13a, 13b, . . . in the first and second embodiments have a dimension D in the direction of electric field, the value D/L influences the half-wave voltage. FIG. 7 shows the results of an experiment about the relationship between D/L and half-wave voltage Vd. Table 1 shows the values D, D/L and Vd at the points "a" through "h" in the graph of FIG. 7.

TABLE 1

| D (µm) | D/L | Vd |
| --- | --- | --- |
| 197 | 4.477 | 135 |
| 147 | 3.341 | 135 |
| 93 | 2.114 | 138 |
| 64 | 1.455 | 139 |
| 46 | 1.045 | 140 |
| 26 | 0.591 | 150 |
| 16 | 0.364 | 170 |
| 5 | 0.114 | 200 |

As is apparent from FIG. 7, when D/L becomes less than approximately 0.5, the half-wave voltage Vd suddenly rises. Accordingly, by designing the individual electrodes 13a, 13b, . . . so that D/L>0.5, the driving voltage can be kept low. There are no particular limitations on the maximum of D/L; however, the value D/L shall be determined in consideration for the size of the chip 10.

Third Embodiment; See FIG. 8

Figure 8:
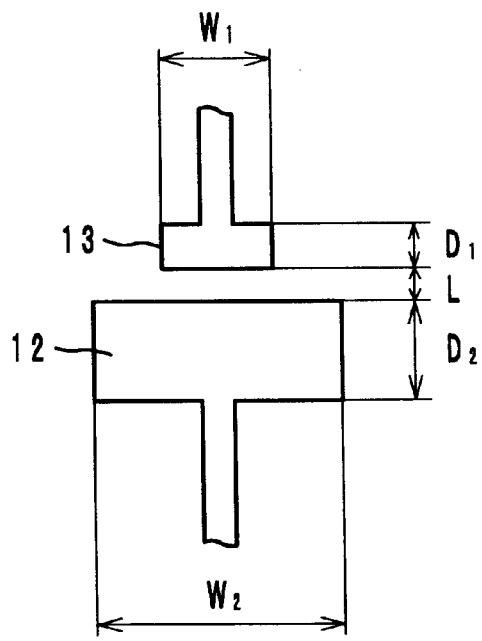
FIG. 8 is a plan view which shows the shape of electrodes of a light shutter device which is a third embodiment of the present invention.

The electrodes may be of the shape shown by FIG. 8, in which large electrodes 12 and small electrodes 13 face each other. In this case, even if the large electrodes 12 satisfy the conditions $W_2/L>2$ and $D_2/L>0.5$, if the small electrodes 13 are on the conditions $W_1/L<2$ and $D_1/L<0.5$, it is not possible to suppress crosstalk. It is necessary that the small electrodes 13 satisfy the conditions $W_1/L>2$ and $D_1/L>0.5$.

Fourth Embodiment; FIGS. 9–12

Figure 9:
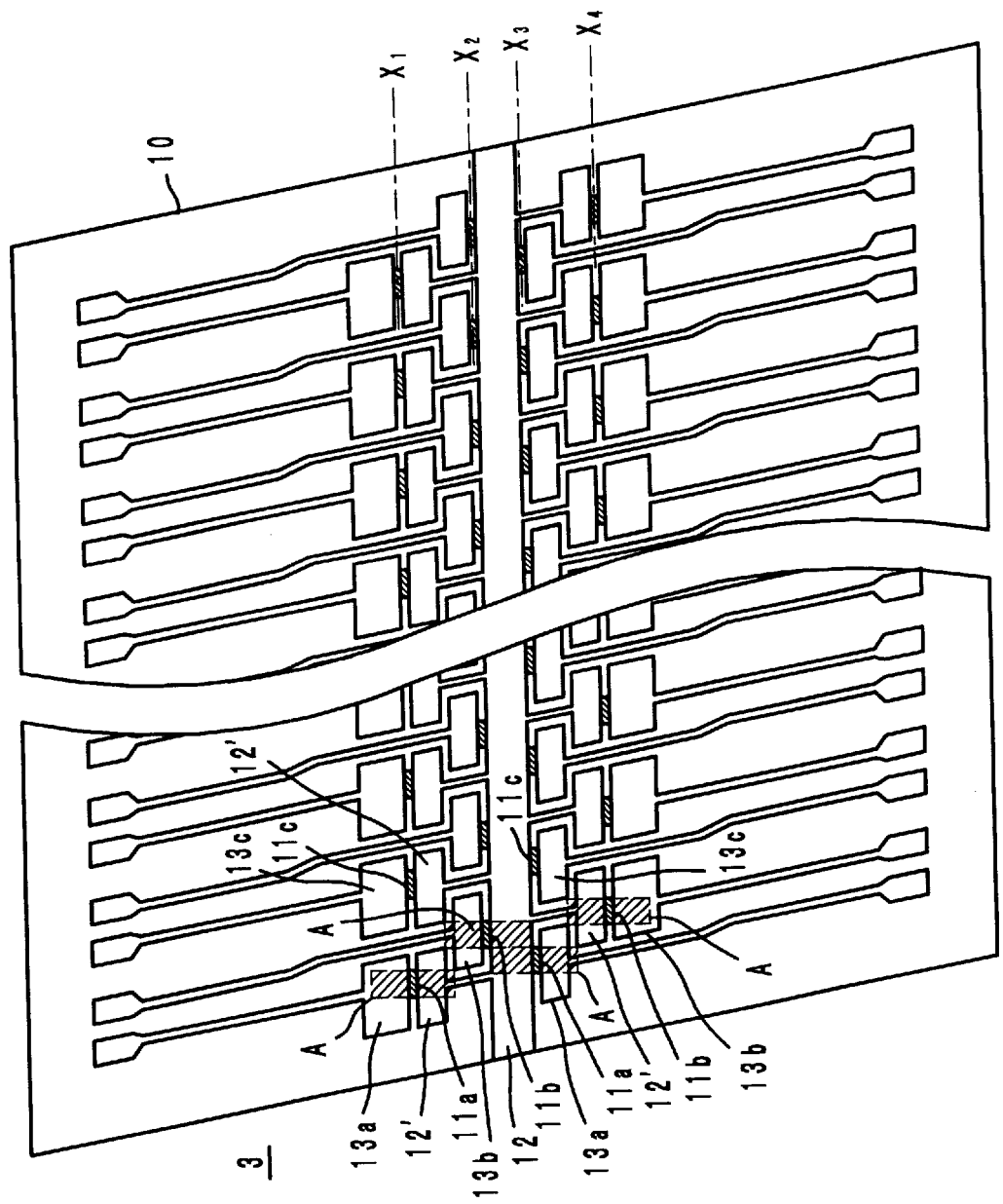
FIG. 9 is a plan view of a principal part of a light shutter device which is a fourth embodiment of the present invention.

FIG. 9 shows a principal part of a light shutter device 3 which is a fourth embodiment of the present invention. In the light shutter device 3, a plurality of light shutter elements 11a, 11b, . . . are arranged in four lines $X_1$, $X_2$, $X_3$ and $X_4$ as in the second embodiment (see FIG. 3).

Figure 10:
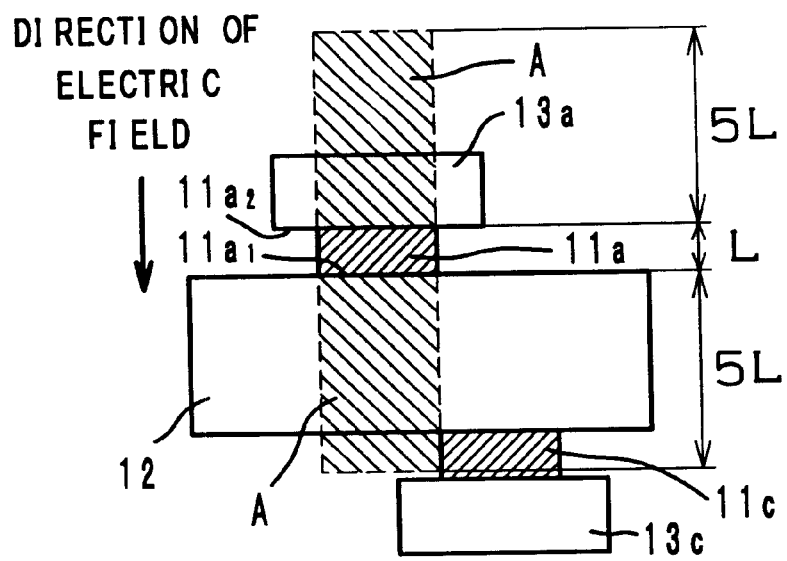
FIG. 10 is a plan view of electrodes which shows the fundamentals of placement of the electrodes in the fourth embodiment.
Figure 11:
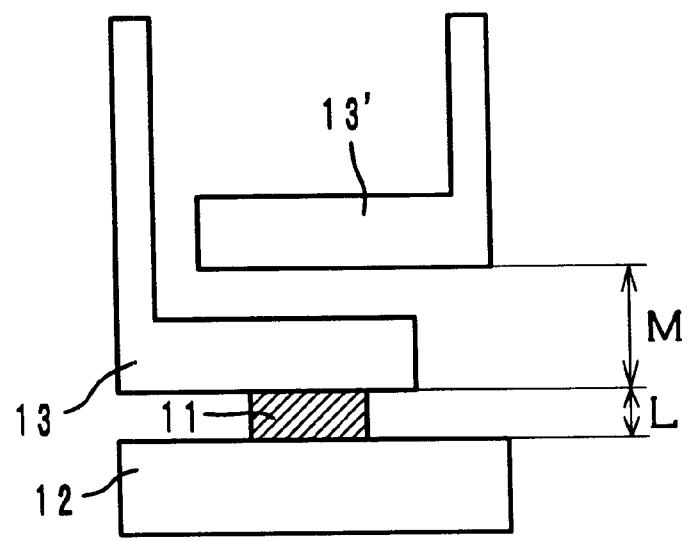
FIG. 11 is a plan view of a test model according to the fourth embodiment.

The characteristic of the fourth embodiment is described referring to FIG. 10. The electrodes 12 and 13a to drive the light shutter element 11a have a gap L in-between. The individual electrode 13c to drive the light shutter element 11c is positioned at a distance not less than 5L from the sides $11a_1$ and $11a_2$ of the light shutter element 11a. In other words, within an area A at a distance not less than 5L from the sides of a light shutter element, no other individual electrodes are arranged.

The reason why no other individual electrodes are arranged within the area A is described. The inventors fabricated a model shown by FIG. 11, and the driving voltage and the quantity of transmitted light were measured. In order to drive a light shutter element 11, an electric field was applied between a common electrode 12 and an individual electrode 13. Another electrode 13' was provided at a distance M from the light shutter element 11. While fixing the distance L between the electrodes 12 and 13 at 20 μm and at 40 μm and changing the distance M between 50 μm and 250 μm, the driving voltage and the quantity of transmitted light were measured to figure out the half-wave voltage. These measurements were carried out on the first condition that the electrode 13' has the same potential as the individual electrode 13 (corresponding to all lighting) and on the second condition that the electrode 13' has the same potential as the common electrode 12 (corresponding to single lighting). A difference in half-wave voltage Vd between a case on the first condition and a case on the second condition is referred to as a shift voltage ΔVd.

Figure 12A:
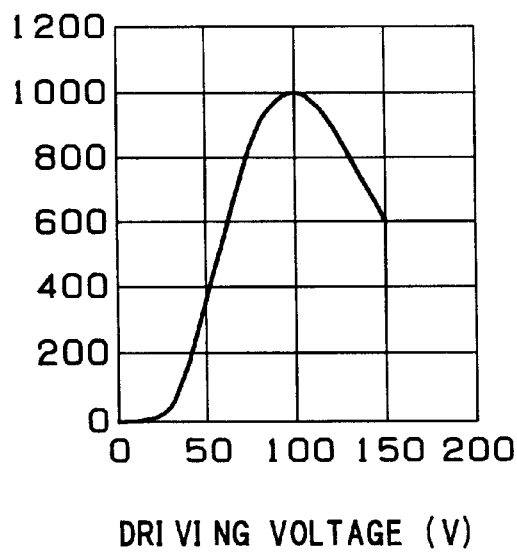
FIGS. 12a and 12b are graphs which show the relationship between driving voltage and quantity of transmitted light in the fourth embodiment.
Figure 12B:
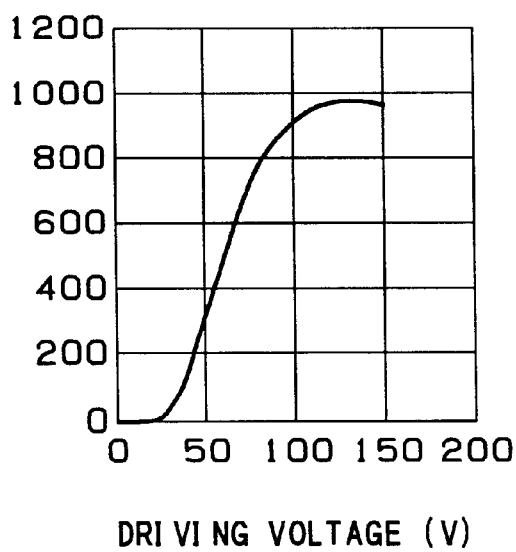

The results of the experiment is partly shown by FIGS. 12a and 12b. FIG. 12a shows a case in which L=20 μm and M=70 μm on the first condition, and in this case, the half-wave voltage was 100V. FIG. 12b shows a case in which L and M are the same as in the case of FIG. 12a on the second condition, and in this case, the half-wave voltage was 130V. The shift voltage ΔVd was 30V.

Table 2 shows the relationship between distance M and shift voltage ΔVd when L=20 μm and when L=40 μm.

TABLE 2

| | M (μm) | | | | | | | |
|---|---|---|---|---|---|---|---|---|
| L (μm) | 50 | 70 | 100 | 140 | 170 | 200 | 230 | 250 |
| 20 | 50 V | 30 V | 8 V | 5 V | 0 C | 0 V | — | — |
| 40 | — | — | 45 V | 30 V | 15 V | 5 V | 0 V | 0 V |

It is ideal that the shift voltage ΔVd is zero (which means that there is no crosstalk); however, if the shift voltage ΔVd is not more than 10V, the quantity of transmitted light decreases only by at most 5%, which is practically no problem. Therefore, the distance M shall be not less than five times the distance L.

In the fourth embodiment, the shift voltage ΔVd was 8V, and the quantity of transmitted light decreased by 3%.

Fifth Embodiment; See FIG. 13

FIG. 13 shows a princiapal part of a light shutter device 4 which is a fifth embodiment of the present invention. This light shutter device 4 is basically of the same structure as the fourth embodiment shown by FIG. 9. However, the width of the extensions 12' of the common electrode 12 and the width of the individual electrodes 13a, 13b, . . . are smaller than those of the fourth embodiment, and the width of the central portion of the common electrode 12 is larger than that of the fourth embodiment. The individual electrodes 13a, 13b, . . . are arranged out of the areas A, that is, each of the individual electrodes is positioned at a distance not less than 5L from the light shutter elements driven by the other individual electrodes. In the fifth embodiment, the shift voltage ΔVd was 5V, and the quantity of transmitted light decreased by 2%.

Figure 14:
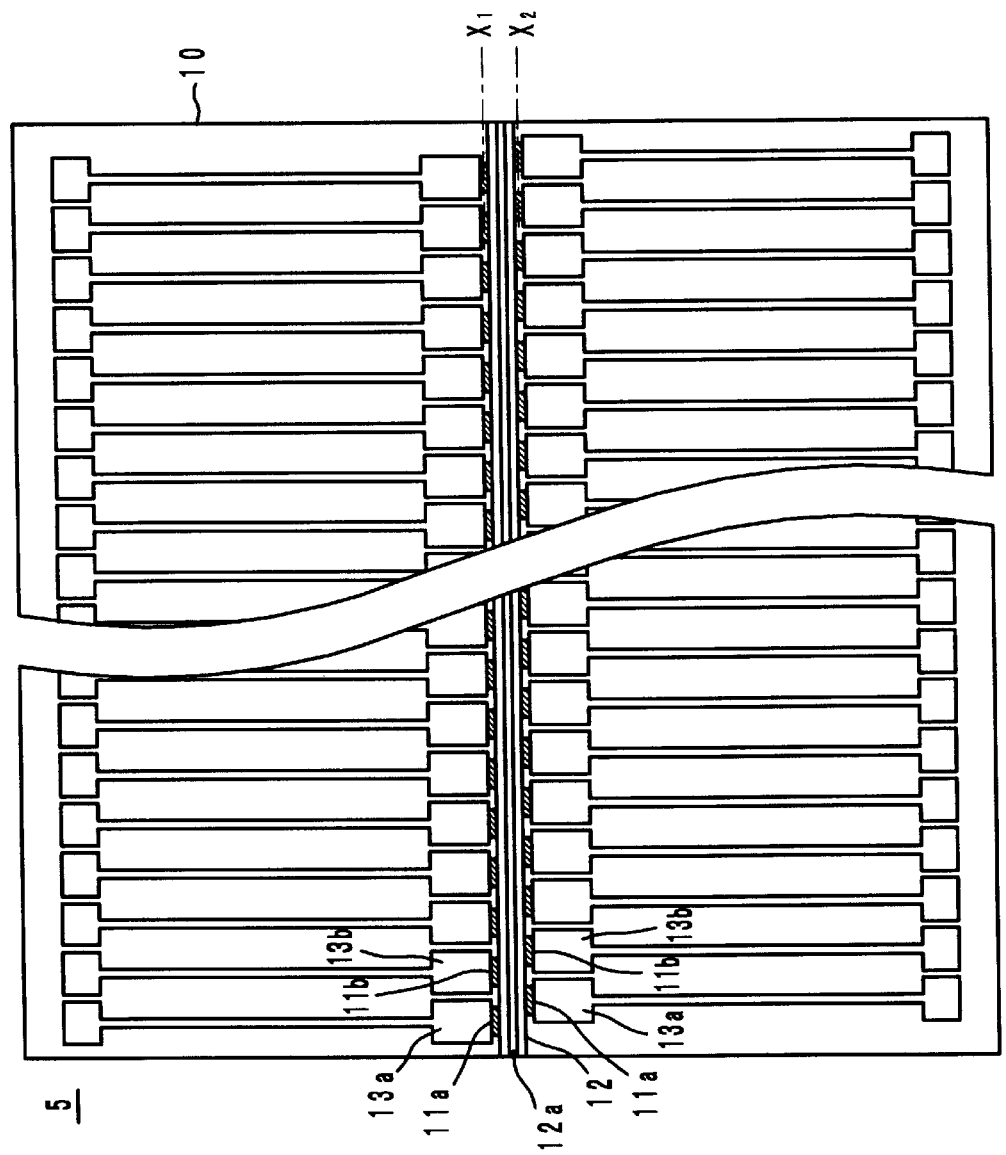
FIG. 14 is a plan view of a principal part of a light shutter device which is a sixth embodiment of the present invention.
Figure 15:
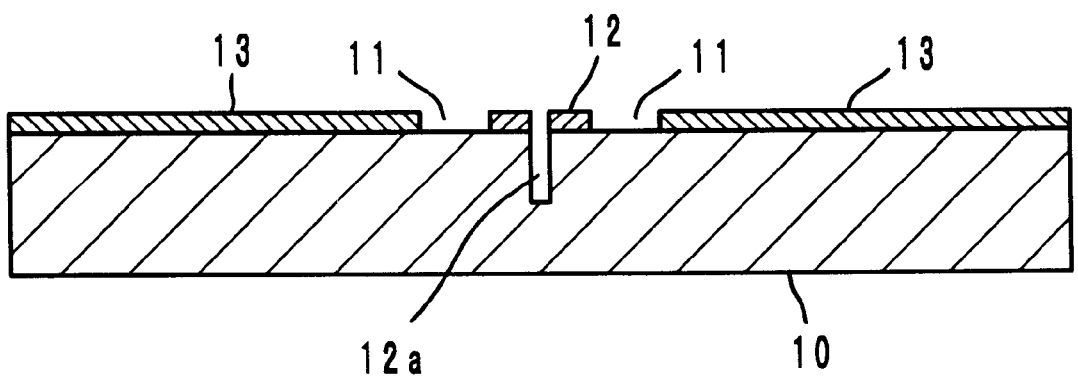
FIG. 15 is an enlarged sectional view of a light shutter chip of the sixth embodiment.

Sixth Embodiment; FIGS. 14 and 15

FIG. 14 shows a principal part of a light shutter device 5 which is a sixth embodiment of the present invention. The light shutter device 5 is basically of the same structure as the first embodiment shown by FIG. 1. The difference is that a groove 12a is formed in the center of the common electrode 12. By separating the common electrode 12 by the groove 12a, crosstalk between the light shutter elements which are arranged on both sides of the common electrode 12 can be suppressed.

In the sixth embodiment, the common electrode 12 has a width of 60 μm, and a groove 12a with a width of 25 μm and a depth of 50 μm is formed. The groove 12a may be formed by cutting, etching (plasma etching, reactive ion etching, wet etching, etc.) or sand blasting. In the sixth embodiment, the shift voltage ΔVd was 0V, and the reduction in quantity of transmitted light was 0%.

The width of the groove 12a is preferably not more than the width of the common electrode 12 minus 10 μm, and the depth of the groove 12a is preferably not less than 5 μm. If the depth is less than 5 μm, the effect of suppressing crosstalk is weak.

Seventh Embodiment; See FIG. 16

Figure 16:
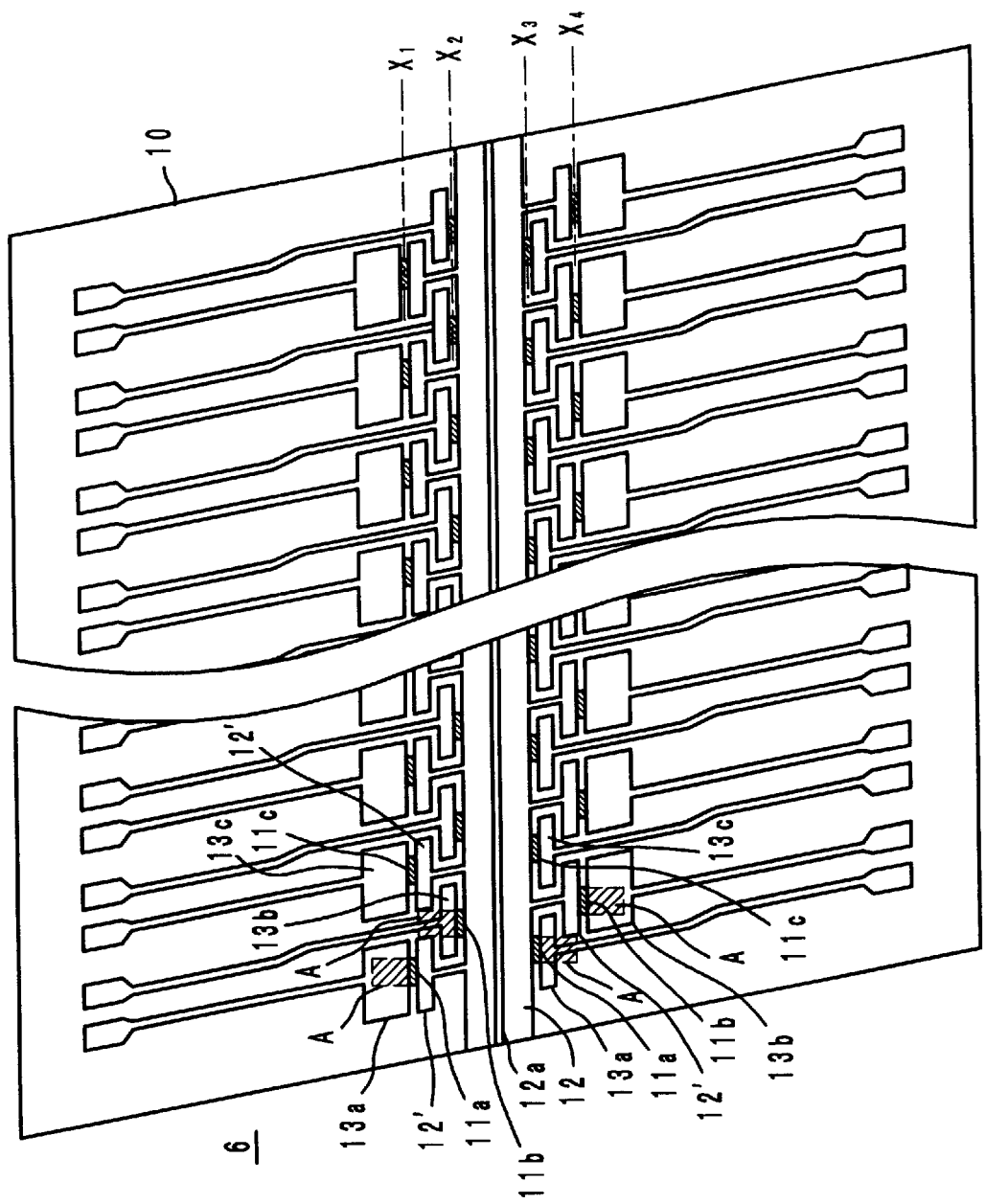
FIG. 16 is a plan view of a principal part of a light shutter device which is a seventh embodiment of the present invention.

FIG. 16 shows a principal part of a light shutter device 6 which is a seventh embodiment of the present invention. This light shutter device 6 is basically of the same structure as the light shutter device 4 of the fifth embodiment, further, a groove 12a is formed in the common electrode 12. The groove 12a is the same as the groove in the sixth embodiment. In the seventh embodiment, the shift voltage ΔVd was 0.2V, and the reduction in quantity of transmitted light was 0%.

Other Embodiments

As the material with an electro-optical effect, not only PLZT but also $LiNbO_3$ and others are usable. The number of lines of the light transmitting portions (light shutter elements) and the details of the electrode pattern are arbitrary.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A light shutter device comprising:
   a planar substrate with an electro-optical effect; and
   a plurality of pairs of electrodes provided on the substrate, portions of the substrate between the respective pairs of electrodes functioning as light shutter elements when electric fields act between the respective pairs of electrodes;
   wherein the electrodes in each pair are at a distance L from each other and a side of one of the electrodes in each pair which extends in a direction perpendicular to the direction of electric field has a dimension W, W/L>2.

2. A light shutter device according to claim 1, wherein the dimension W is of the electrode in each pair which is shorter in the direction perpendicular to the direction of electric field.

3. A light shutter device according to claim 1, wherein a side of one of the electrodes in each pair which extends in the direction of electric field has a dimension D, D/L>0.5.

4. A light shutter device according to claim 3, wherein the dimension D is of the electrode in each pair which is shorter in the direction of electric field.

5. A light shutter device according to claim 1, wherein the plurality of pairs of electrodes are composed of a common electrode which extends in a specified direction and a plurality of individual electrodes which are arranged along at least one side of the common electrode so that each of the individual electrodes faces the common electrode.

6. A light shutter device according to claim 5, wherein the common electrode has extensions which extend from a central portion in a direction perpendicular to the specified direction.

7. A light shutter device according to claim 6, wherein the individual electrodes face the central portion of the common electrode and the extensions of the common electrode alternate with respect to the specified direction.

8. A light shutter device according to claim 1, wherein the substrate with an electro-optical effect is made of PLZT.

9. A light shutter device comprising:

a planar substrate with an electro-optical effect;

a common electrode which extends in a specified direction on the substrate; and a plurality of individual electrodes which are arranged along the specified direction so that each of the individual electrodes faces the common electrode, portions of the substrate between the common electrode and the respective individual electrodes functioning as light shutter elements when electric fields act between the common electrode and the respective individual electrodes;

wherein each of the individual electrodes faces the common electrode at a distance L, each of the light shutter elements is at a distance not less than 5L from each of the individual electrodes which drive the other light shutter elements.

10. A light shutter device according to claim 9, wherein the distance between each of the light shutter elements and each of the individual electrodes which drive the other light shutter elements means the distance between a side of the light shutter element which extends in a direction perpendicular to the direction of electric field acting on the light shutter element and each of the individual electrodes which drive the other light shutter elements.

11. A light shutter device according to claim 9, wherein the substrate with an electro-optical effect is made of PLZT.

12. A light shutter device comprising:

a planar substrate with an electro-optical effect;

a first common electrode which extends in a specified direction on the substrate;

a second common electrode that also extends in the specified direction on the substrate, wherein the second common electrode is separated from the first common electrode by a groove that extends in the specified direction; and a plurality of individual electrodes arranged so that each of the individual electrodes faces one of the common electrodes, wherein the first common electrode is positioned between the groove and at least one of the individual electrodes and the second common electrode is positioned between the groove and at least another one of the individual electrodes, portions of the substrate between the first common electrode and the respective one or more individual electrodes and those between the second common electrode and the respective one or more other individual electrodes functioning as light shutter elements when electric fields act between the common electrode and the respective individual electrodes.

13. A light shutter device according to claim 12, wherein each of the individual electrodes faces its respective common electrode at a distance L, each of the light shutter elements is at a distance not less than 5L from each of the individual electrodes which drive the other light shutter elements.

14. A light shutter device according to claim 13, wherein the distance between each of the light shutter elements and each of the individual electrodes which drive the other light shutter elements means the distance between a side of a light shutter element which extends in a direction perpendicular to the direction of electric field acting on the light shutter element and each of the individual electrodes which drive the other light shutter elements.

15. A light shutter device according to claim 12, wherein the groove has a width, measured in the direction of the electric field, that is equal to or less than distance, measured in a corresponding direction, across the first common electrode and the second common electrode minus 10 $\mu$m.

16. A light shutter device according to claim 12, wherein the groove has a depth not less than 5 $\mu$m.

17. A light shutter device according to claim 12, wherein the substrate with an electro-optical effect is made of PLZT.

18. A light shutter device comprising:

a planar substrate with an electro-optical effect; and a plurality of pairs of electrodes provided on the substrate, comprising of a plurality of individual electrodes paired with one or more common electrodes, portions of the substrate between the respective pairs of electrodes functioning as light shutter elements when electric fields act between the respective pairs of electrodes;

wherein at least one pair of the pairs of electrodes are at a distance L from each other, wherein one of the electrodes in that pair has a side that extends in a direction that is perpendicular to the direction of electric field, the side has a dimension W, wherein W/L>2.

19. A light shutter device comprising:

a planar substrate with an electro-optical effect;

a common electrode which extends in a specified direction on the substrate; and a plurality of individual electrodes which are arranged along the specified direction so that each of the individual electrodes faces the common electrode, portions of the substrate between the common electrode and the respective individual electrodes functioning as light shutter elements when electric fields act between the common electrode and the respective individual electrodes;

wherein at least one of the individual electrodes faces the common electrode at a distance L, and the light shutter element between that individual electrode and the common electrode is at a distance not less than 5L from each of the other individual electrodes which drive the other light shutter elements.

* * * * *